United States Patent
Oniki et al.

[11] Patent Number: 5,875,083
[45] Date of Patent: Feb. 23, 1999

[54] MAGNETIC DISC HAVING PLANIARIZED CSS ZONE

[75] Inventors: Kazunao Oniki, Tokyo; Osamu Morita; Hiroshi Takino, both of Miyagi, all of Japan

[73] Assignee: Sony Corporation, Tokyo, Japan

[21] Appl. No.: 772,322

[22] Filed: Dec. 23, 1996

Related U.S. Application Data

[63] Continuation of Ser. No. 494,773, Jun. 26, 1995, abandoned.

[30] Foreign Application Priority Data

Jun. 30, 1994 [JP] Japan ................................... 6-150113

[51] Int. Cl.$^6$ ........................................................ G11B 5/82
[52] U.S. Cl. ............................................................. 360/135
[58] Field of Search ................................ 360/135, 77.08, 360/77.11, 77.05, 78.08, 46

[56] References Cited

U.S. PATENT DOCUMENTS 5,138,511  8/1992  Hoshimi et al. ........................ 360/135
5,373,403  12/1994  Okamura et al. ......................... 360/46

FOREIGN PATENT DOCUMENTS 4-38716(A)   7/1992   Japan .
6-103563(A)  4/1994   Japan .

*Primary Examiner*—John H. Wolff
*Attorney, Agent, or Firm*—Hill & Simpson

[57] ABSTRACT

A magnetic disc has a magnetic recording area on or from which the information may be recorded or reproduced by a recording head loaded on a slider. The magnetic recording area has a data area including a recording track as a crest and a guard band as a valley, and a servo area having servo marks as crests and valleys. A CSS area for contact-start-stop (CSS) with the slider is made up of CSS data areas radially consecutive to the data areas and CSS servo areas radially consecutive to the servo areas. The entire surfaces of the CSS servo areas may be planarized at the same height level as the recording tracks. The CSS servo areas are provided with the same pattern of crests and valleys similar to that of the data areas. This suppresses generation of powder debris during CSS while optimizing the amount of float of the slider and the floating posture in the CSS area.

2 Claims, 6 Drawing Sheets

MAGNETIC DISC HAVING PLANIARIZED CSS ZONE

This is a continuation of application Ser. No. 08/494,773, filed Jun. 26, 1995, now abandoned.

BACKGROUND OF THE INVENTION

This invention relates to a magnetic disc having crests and valleys formed in its magnetic recording area. More particularly, it relates to a magnetic disc in which contact start stop (CSS) with respect to a slider carrying a magnetic head for writing/readout on or from a magnetic disc may be performed in stability.

A magnetic recording medium for recording/reproducing the digital information by a magnetic head, such as a magnetic disc, has servo marks, that is recorded position signals, formed thereon for tracking the magnetic head. The "tracking" herein means causing the magnetic head to correctly follow a recording track bearing a desired address.

These servo marks are recorded by a servo writer simultaneously with data recording. With progress in high density recording and concomitant reduction in the recording track width, high servo mark position density has become necessary, such that it has become necessary to maintain high position accuracy between the servo writer and the associated mechanical components of the magnetic recording apparatus. Since this necessitates a high technical level, the recording/reproducing apparatus becomes costly.

Thus a variety of methods have been proposed for raising position signal accuracy by pre-forming servo marks on a magnetic disc. Among these are a method of forming servo marks by etching a magnetic layer or non-magnetizing a portion of the magnetic layer, and a method of forming servo marks by forming crests and valleys in a disc substrate.

In forming servo marks by crests and valleys, since the recording tracks and guard bands separating the recording tracks from one another may be formed simultaneously as crests and valleys, respectively, a so-called discrete type magnetic disc may be formed easily. With the magnetic disc, having the servo marks and the recording tracks thus formed by crests and valleys, recording/readout may be performed with a high track-pitch tracking operation and at a high signal-to-noise ratio.

Referring to FIG. 1, an illustrative magnetic disc, as loaded on a floating magnetic head recording/reproducing apparatus, is explained in detail.

The magnetic disc 101 has a magnetic recording area 102 for writing/reading the information by a magnetic head, a clamping area 103 on the inner rim of the disc and a landing area 104 on the outer rim of the disc.

The magnetic recording area 102 has a data area 105 made up of convex-shaped recording tracks and recessed guard bands, and a servo area 106, in the form of crests and valleys, for radially dividing the data area 105.

The magnetic disc 101 is loaded on the floating magnetic head type recording/reproducing apparatus, by the clamping area 103 being secured by the damper 114, and is rotated by a spindle motor, not shown.

On top of the magnetic disc 101 is supported a slider 111 carrying the magnetic head by an arm 112, which is rotated with a rotary shaft 113 as the center of rotation for shifting the slider 111 along the radius of the magnetic disc 101.

For floating the slider 111 above the magnetic disc 101, the slider is set in a CSS area inwardly of the magnetic recording area 102. The slider 111 is floated on starting rotation of the magnetic disc 101. When the slider 111 is floated, it is shifted by the arm 112 to a position overlying the magnetic recording area in order to follow the desired recording track in the data recording area 105 for writing/reading. After termination of the writing/reading, the rotation of the magnetic disc 101 is terminated for again landing the slider in the CSS area.

Although the CSS area is not an area of actually writing and/or reading the information, it is within an area within which the slider 111 is moved on driving the floating magnetic head type recording/reproducing apparatus. For this reason, it may be envisaged to provide a pattern of crests and valleys similar to that provided in the magnetic recording area 102. In such case, a pattern of crests and valleys similar to the pattern of the recording tracks and the guard bands is provided in the portion of the CSS area representing the radial continuation of the servo area 106, referred to herein as a CSS servo area. Similarly, a pattern of crests and valleys similar to that of the servo marks is provided in the portion of the CSS area representing the radial continuation of the servo area 106, referred to herein as a CSS servo area.

However, if contact-start-stop is actually performed in the CSS area having a pattern of crests and valleys similar to those in the magnetic recording area 102, powder debris is incurred by frictional contact between the slider 111 and the CSS area. This is presumably attributable to the fact that, since the relative proceeding direction of the slider 111 and the pattern of crests and valleys in the CSS servo area are substantially at right angles to each other, the crests in the CSS servo area scraped off the surface of the slider 111.

The powder debris thus produced give rise to injuries to the slider 111 and the magnetic disc 101.

On the other hand, the fact that the relative proceeding direction of the slider 111 and the pattern of crests and valleys of the CSS servo area are substantially at right angles to each other renders the float amount of the slider 111 liable to deteriorate the floating posture of the slider 111.

SUMMARY OF THE INVENTION

In view of the foregoing, it is an object of the present invention to provide a magnetic disc in which, when the disc is loaded on a floating magnetic head in order to effect the CSS, there is no risk of powder debris from the CSS area and a stable float amount may be afforded to the slider.

According to the present invention, there is provided a magnetic disc having a magnetic recording area on or from which the information may be recorded or reproduced by a recording head loaded on a slider, and a CSS area for contact-start-stop operations for the slider. The magnetic recording area is made up of data areas each having recording tracks and guard bands, both in the form of crests and valleys, respectively, and servo marks in the form of crests and valleys. The CSS area is made up of CSS data areas radially consecutive to the data areas and CSS servo areas radially consecutive to the servo areas. The CSS servo areas are planarized at least in the circumferential direction of the magnetic disc.

The CSS servo area may be planarized in its entirety at the same height level as the guard bands or the recording tracks, or may be provided with the same pattern of crests and valleys as those of the data area.

If the CSS servo area is planarized in its entirety at the same height level as the guard bands, the entire surface of the CSS data area may be of the same height as the guard bands. Alternatively, the CSS data area may be provided with the same pattern of crests and valleys as that of the data areas.

If the CSS servo area is planarized in its entirety at the same height level as the recording tracks, the entire surface of the CSS data areas may be at the same height as the recording tracks, and may be planarized in its entirety. The CSS data areas may also be provided with the same pattern of crests and valleys as that of the data areas.

If the entire surface of the CSS servo areas is provided with the pattern of crests and valleys similar to that of the data areas, the CSS data areas may also be provided with the pattern of crests and valleys similar to that of the data areas.

Since the CSS area is an area for use for slider floating/landing, writing or readout of the information is not made in the CSS data area, while there is no position information written in the CSS servo areas. The region in the CSS area radially consecutive to the data areas of the magnetic recording area and the region in the CSS area radially consecutive to the servo areas of the magnetic recording area are herein termed the CSS data areas and the CSS servo areas, respectively. The pattern of the concentrically arranged crests and valleys of the data areas of the magnetic recording area is split by radially extending patterns of crests and valleys of the servo area, while the pattern of the concentrically arranged patterns of crests and valleys of the CSS area is split by the CSS servo areas. The boundary line between the CSS data areas and the CSS servo areas is on the lines of extension of the boundary lines between the data areas and the servo areas in the magnetic recording area.

However, if the entire surface of the CSS area is planarized, or the pattern of crests and valleys similar to that of the data areas is provided on the entire surface of the CSS area, there is no explicit boundary line between the CSS data areas and the CSS servo areas.

With the above-described magnetic disc, the magnetic layer is formed on a disc substrate having a desired pattern of crests and valleys formed thereon. In the servo area, the magnetic layer is magnetized on the valleys to the opposite polarity to that on the crests. In the data area, the magnetic layer is evenly formed on the disc substrate on which the crests as the recording tracks and the valleys as the guard bands are previously formed. Although the information writing and/or readout is not performed in the CSS area, it is desirable to form the magnetic layer similar to that provided on the magnetic recording area in order not to produce significant difference in the amount of float of the slider between the CSS area and the magnetic recording area.

The disc substrate may be a disc substrate formed by injection molding of synthetic resin. In the former case, the pattern of the crests and valleys may be pre-formed by a stamper secured in the metal mold during injection molding. In the latter case, such pattern may be formed by etching using photolithographic techniques. The pattern of crests and valleys formed by injection molding is of extremely high accuracy in registration because the stamper may be worked with extremely high accuracy by the mastering techniques. The pattern of the crests and valleys formed by etching is also superior in accuracy in registration since photolithography allows extremely fine working.

An illustrative resin material for the disc substrate is polycarbonate resin. However, any prior-art material, such as norbornene based resin low in hygroscopicity and superior in thermal resistance, may be employed.

The disc substrate may be of a thickness of 0.3 to 2 mm in order to raise the resonance frequency of the magnetic disc to higher than the servo range and to enable a required number of the magnetic discs to be accommodated in the limited space of the recording/reproducing apparatus.

The magnetic disc according to the present invention may be provided on the disc substrate with an underlying layer, a protective layer and a lubricant coating layer, in addition to the magnetic layer. Although there is no limitation to the material or the forming methods for the underlying layer, magnetic layer, protective layer or the lubricant coating layer, a metal layer of Cr or Mo, a magnetic metal thin film, such as CoPt, CoPd or CoCrPt, and a film of C or $SiO_2$, may be formed by sputtering as the underlying layer, magnetic layer and a protective layer, respectively. As the lubricant coating layer, any of lubricants as known in the art may be applied by spin coating or the like. The CSS area may also be provided outside of the magnetic recording area instead of inside the magnetic recording area.

The magnetic discs according to the present invention are insusceptible to generation of powder debris on being loaded on the floating magnetic head type recording/reproducing apparatus for CSS since there is no pattern of crests and valleys extending at right angles to the relative proceeding direction of the slider in the CSS data areas nor in the CSS servo areas and hence there is no risk of the pattern of crests and valleys scraping the material off the slider surface. If the powder debris is prevented from being produced, it becomes possible to prevent damages from being inflicted due to the powder to the slider or the magnetic disc.

Above all, if the CSS area is planarized in its entirety, the powder debris is least liable to be produced, while the floating posture of the slider is also stabilized. The floating amount of the slider becomes maximum if the entire surface of the CSS area is at the same height as the recording track.

On the other hand, if the CSS data area is provided with the same pattern of crests and valleys, and the CSS servo areas are planarized at the same height as the guard bands, the valleys in the CSS data areas are at the same height level as the CSS servo area, such that the valleys in the CSS data areas may be planarized over the entire circumference. If the CSS servo areas are planarized at the same height as the recording tracks, the crests in the CSS data areas are at the same height level as the CSS servo area, such that the crests in the CSS data areas may be planarized over the entire circumference. The term planarized, as used herein, means that the crests are at the same height.

If the above-described CSS area is provided inside of the magnetic recording areas, the floating posture of the slider is stabilized during writing and/or readout on or from the inner most recording track in the magnetic recording area, since the amounts of float the CSS area and the magnetic recording area afforded to the slider are of the same order of magnitudes. When the slider is floated in the CCS area and subsequently the slider is moved towards the magnetic recording area, the information writing/readout may be started with the stabilized floated posture since the amount of float is small.

If the pattern of crests and valleys similar to that of the data area is provided in the CSS data area and the pattern of crests and valleys similar to that of the data area is provided in the CSS servo area, the crests in the CSS area may be planarized over the entire circumference, thus assuring facilitated floating posture of the slider in the CSS area. It is noted that, if the above-described CSS area is provided inside of the magnetic recording area, the floating posture of the slider can be stabilized easily because the pattern of crests and valleys of the data area is the same as that of the CSS data areas for writing or readout.

It is seen that the magnetic discs of the present invention are insusceptible to generation of powder debris when loaded on the floating magnetic head type recording/reproducing apparatus for CSS operations, thus preventing damage to the slider or the magnetic disc due to powder debris.

If the entire surface of the CSS area is planarized, the floating posture of the slider in the CSS area is also stabilized, If the pattern of crests and valleys similar to that provided in the data area is provided in the CSS data area, the floating posture of the slider is stabilized when the slider floated in the CSS area is moved to the magnetic recording area or the information is written on or read out from the inner most recording track of the magnetic recording area, thereby improving data writing/readout accuracy on starting the data writing/readout.

The magnetic disc according to the present invention may be produced without increasing the number of process steps or raising the cost as compared to the conventional magnetic disc.

DETAILED DESCRIPTION OF PREFERRED EMBODIMENTS

Figure 1:
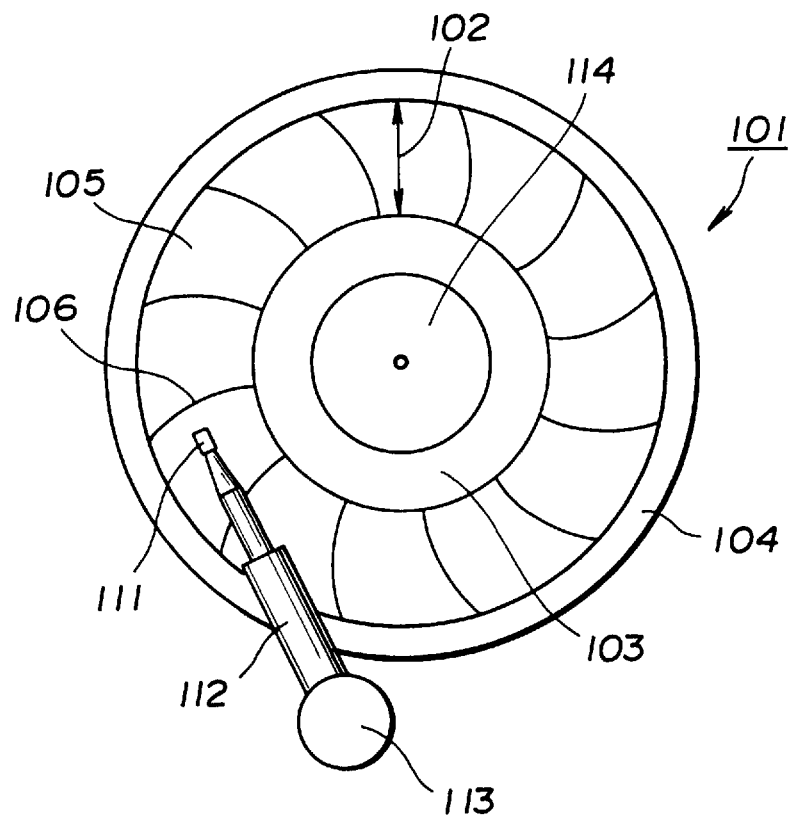
FIG. 1 is a schematic plan view showing the state in which a conventional magnetic disc is loaded on a floating magnetic head recording/reproducing apparatus.

The present invention will be explained in detail with reference to illustrative Examples shown in the drawings.

EXAMPLE 1

In the present Example 1, a magnetic head 1 has its entire CSS area at the same level as the recording track in the magnetic recording area, that is the crest.

Figure 2:
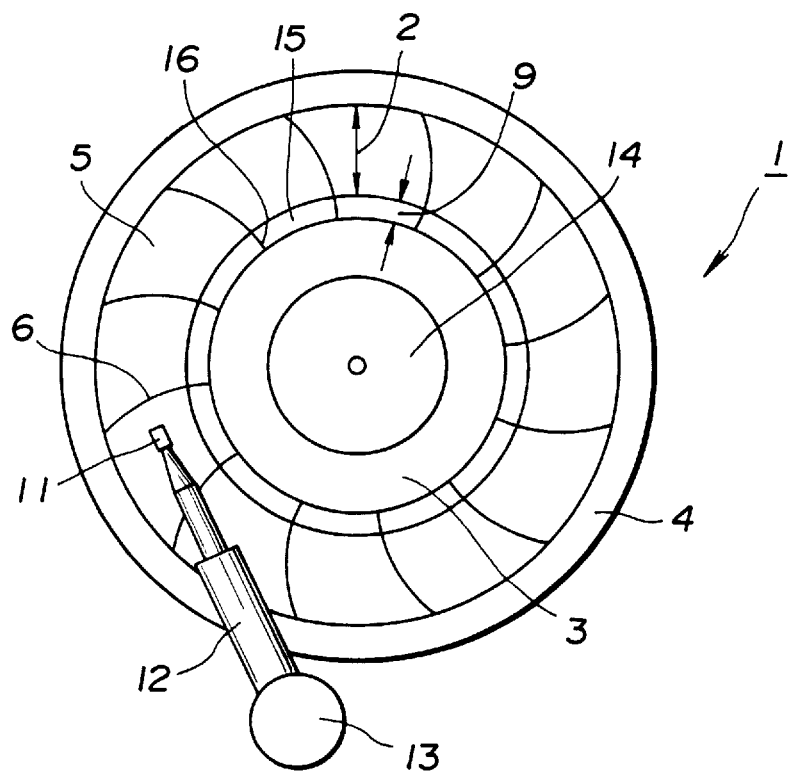
FIG. 2 is a schematic plan view showing the state in which a magnetic disc according to the present invention is loaded on a floating magnetic head recording/reproducing apparatus.

FIG. 2 shows the state in which the magnetic disc 1 is loaded on a floating magnetic head recording/reproducing apparatus. The magnetic disc 1 has a disc substrate which is 65 mm in outer diameter, 20 mm in inner diameter, and 0.9 mm in thickness and on which an underlying layer, a magnetic layer and a lubricant coating layer are formed in this order. The magnetic disc 1 has a magnetic recording area 2 for writing/reading the information, a clamping area 3 on the radially inner side of the magnetic recording area 2 and a landing area 4 on the radially outer side of the magnetic recording area 2. On the radially inner side of the magnetic recording area 2 is a CSS area 9 for floating/landing of the slider 11.

The magnetic disc 1 is loaded on a floating magnetic head recording/reproducing apparatus by having its clamping area 3 secured by a damper 14, and is rotated by a spindle motor, not shown. Over the magnetic disc 1 is supported a slider 11, which is 2 mm in length, 1.6 mm in width and 0.4 mm in thickness, by an arm 12 which is 40 mm in length. The slider 11 carries a magnetic head on its rear outer periphery on its lower surface. The slider 11 is movable along the radius of the disc 1 by rotation of the arm 12 about a rotary shaft 13 as the center of rotation. The slider 11 s floated on rotating the magnetic disc with the slider 11 being previously set on the CSS area 9.

The magnetic recording area 2 of the magnetic disc 1 is provided in a region from 15 mm to 28 mm as measured from the disc center, and is actually made up of plural data areas 5 in or from which the data is recorded or reproduced by the magnetic head, and plural servo areas 6 having preformatted therein the information as an aid for tracking the magnetic head to a recording track having a desired address.

Figure 3:
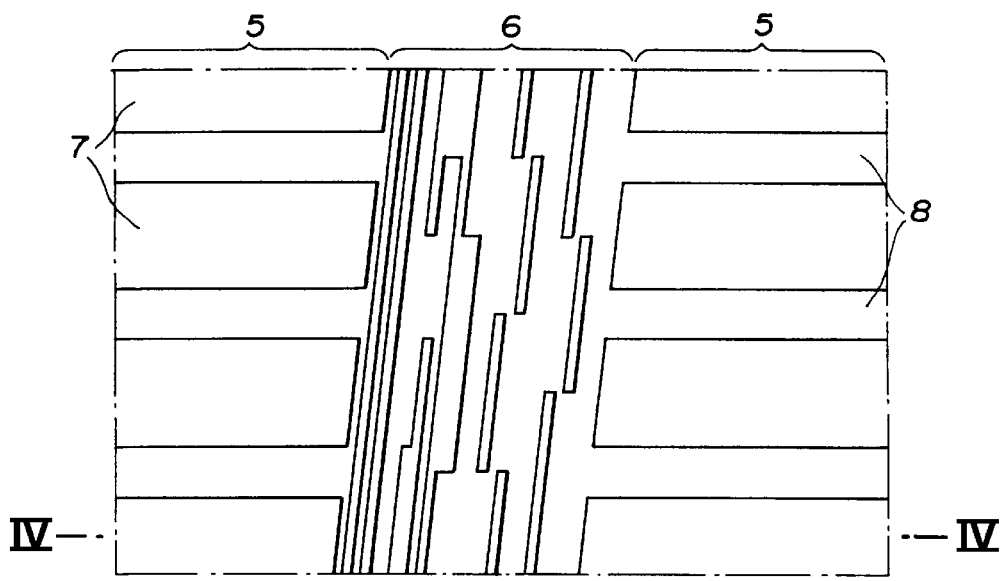
FIG. 3 is an enlarged schematic plan view showing a portion of a magnetic recording area in a magnetic disc according to the present invention.

FIG. 3 shows a portion of the magnetic recording area 2 to an enlarged scale. Each data area 5 is made up of a number of concentric recording tracks 7 and a number of guard bands 8 separating the neighboring recording tracks from each other. Each servo band 6 is provided for radially dividing the neighboring data areas 5 into 420 regions and is made up of address marks and fine marks. In FIG. 2, the magnetic disc 1 is shown only schematically, with the number of the servo areas being smaller than the actual number.

Figure 4:
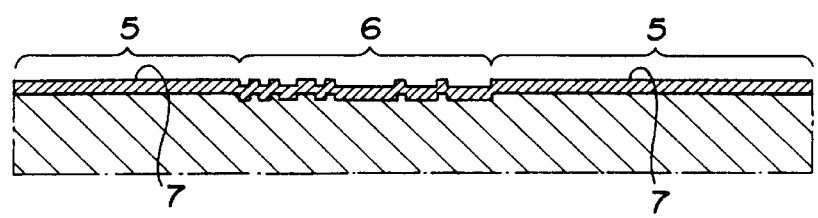
FIG. 4 is a schematic cross-sectional view taken along line A—A' in FIG. 3.

In the data area 5, the recording tracks 7 are formed as crests, while the guard bands 8 are formed as valleys. In the servo area 6, servo marks are formed by crests and valleys and the magnetic layer is magnetized so that the direction of magnetization in the valleys is reversed from that in the crests. From FIG. 4, which is a cross-sectional view taken along line A—A' in FIG. 3, it may be seen that the recording track 7 in the data area 5 is in the shape of a crest and the servo area 6 is made up of crests and valleys.

In the above magnetic disc 1, a radially inner region with respect to the magnetic recording area 2 is a CSS area having a width of 12.0 mm to 15.0 mm from the disc center. A CSS data area 15 consecutive to the data area 5 and a CSS servo area 16 consecutive to the servo area 6 are planarized at a height equal to that of the recording track 7 in the data area 5.

For producing the magnetic disc 1, pellets of a polycarbonate resin are introduced into a metal mold having a fixed stamper, using an injection molding machine, for molding a disc substrate having the above-mentioned outer shape and a pattern of crests and valleys. The depth of the valley in the pattern is 0.2 μm on an average, with the valleys being of a depth within ±10% of the average value of 0.2 μm.

On the above disc substrate, an underlying layer of Cr, a magnetic layer of CoCrPt and a protective film of C were formed in this order to thicknesses of 150 nm, 60 nm and 10 nm, respectively. A lubricant sold under the trade name of Fomblin Z-DOL was then coated to a thickness of 2 nm.

The servo mark preformatting on the servo area 6 was then carried out by a two-stage magnetization method using a magnetic head having a magnetic gap of 0.3 μm and a track width of 4.0 μm. That is, at the first stage, the magnetic layer was magnetized on the valleys and crests of the disc substrate to the same direction with a sufficiently large recording current using a magnetic head. Then, at the second stage, the direction of magnetization was reversed only of the magnetic layer on the crests, using the recording current smaller than that used at the first stage. The result is that the direction of magnetization was reversed in the valleys from that in the crests and the stray magnetic flux emanating from the area of reversal of magnetization at the boundary between the valleys and the crests could be used as the position signal.

For loading the magnetic disc 1 on the floating magnetic head recording/reproducing apparatus and driving the disc thereon, the slider 11 is set on the CSS area 9 of the magnetic disc secured by the damper 14. The magnetic disc is rotated by a spindle motor for floating the slider 11. The position signal is detected from the servo area 6 of the magnetic disc by the magnetic head loaded on the rear outer peripheral terminal area on the lower surface of the magnetic disc. A rotary shaft 13 of the arm 12 is rotated for tracking the magnetic head on a desired one of the recording tracks 7. This causes the magnetic head to follow the desired recording track 7 to effect data writing/readout.

EXAMPLE 2

With the magnetic disc of the present Example 2, the same pattern of crests and valleys as that on the data area 5 is formed on the CSS data area 15, and the CSS servo area 16 is planarized to the same height as that of the guard band 8.

That is, the CSS data area 15, provided in continuation to the data area 5, has crests and valleys similar to those of the recording tracks 7 and the guard bands 8 in the data area 5, respectively, while the CSS servo area 16 is planarized to the same height as the guard band 8 in the data area 5. The result is that, while the boundary line between the CSS data area 15 and the CSS servo area 16 is on a line of extension of the boundary between the data area 5 and the servo area 6, the valleys in the CSS data areas 15 are planarized over the entire circumference.

The magnetic disc of the present Example is similar to the magnetic disc 1 of Example 1 except the above-described constitution of the CSS area 9.

EXAMPLE 3

With the magnetic disc of the present Example 3, the same pattern of crests and valleys as that on the data area 5 is formed on the CSS data area 15, and the CSS servo area 16 is planarized to the same height as that of the recording track 7.

That is, the CSS data area 15 has crests and valleys similar to those of the recording tracks 7 and the guard bands 8 in the data area 5, respectively, while the CSS servo area 16 is planarized to the same height as the recording tracks 7 in the data area 5. The result is that, while the boundary line between the CSS data area 15 and the CSS servo area 16 is on a line of extension of the boundary between the data area 5 and the servo area 6, the crests in the CSS data areas 15 are planarized over the entire circumference.

The magnetic disc of the present Example is similar to the magnetic disc 1 of Example 1 except the above-described constitution of the CSS area 9.

EXAMPLE 4

In the magnetic disc of the present Example 4, the pattern of crests and valleys similar to those of the data area 5 is formed not only in the CSS data area 15 but also in the CSS servo area 16.

That is, the CSS data area 15 has crests and valleys similar to those of the recording tracks 7 in the data area 5 and the guard bands in the data area 5. Similarly to the CSS data area, the CSS servo area 16 has crests and valleys similar to those of the recording tracks 7 in the data area 5 and the guard bands in the data area 5. The result is that there is no boundary between the CSS data area 15 and the CSS servo area 16 and both the crests and valleys of the CSS area 9 are planarized over the entire circumference of the magnetic disc.

The magnetic disc of the present Example is the same as the magnetic disc 1 shown in Example 1 except the above-described constitution of the CSS area 9.

COMPARATIVE EXAMPLE 1

With magnetic disc of the present Comparative Example, the CSS servo area 16 has a pattern of crests and valleys similar to those of the servo area 6.

That is, the CSS data area 15 has crests and valleys similar to those of the recording tracks 7 and the guard bands 8 in the data area 5, respectively, while the CSS servo area 16 has a pattern of crests and valleys similar to the servo marks in the servo area 6. The result is that, in the CSS area 9, similarly to the magnetic recording area 2, the pattern of crests and valleys in the CSS data area 15 is substantially at right angles to the pattern of crests and valleys in the servo area 16.

The magnetic disc of the present Comparative Example is the same as the magnetic disc 1 shown in Example 1 except the above-described constitution of the CSS area 9.

EVALUATION OF PROPERTIES

The magnetic discs of the Examples 1 to 4 and the Comparative Example 1 were checked as to occurrence of powder debris during the CSS operation. Specifically, a slider having a load of 3 g was set on the CSS area spaced 28 mm from the disc center and the operation of rotating the magnetic disc for three seconds at an rpm of 3600 and stopping the disc for 5 seconds was repeated 10,000 times, after which the surface of the CSS area 9 was visually observed.

It was thus found that there was no powder debris produced with the magnetic discs of the Example 1 to 4 by friction between the slider 11 and the surface of the CSS area 9 during the CSS operation. However, with the magnetic disc of the Comparative Example 1, powder debris was produced by the crests of the servo area 16 extending substantially at right angles to the relative running direction of the slider 11 rubbing against the lower surface of the slider 11.

Thus it has been found that powder debris may be prevented by not providing the pattern of crests and valleys substantially at right angles to the relative running direction of the slider 11, that is by planarizing the CSS servo area at least in the circumferential direction.

Figure 5:
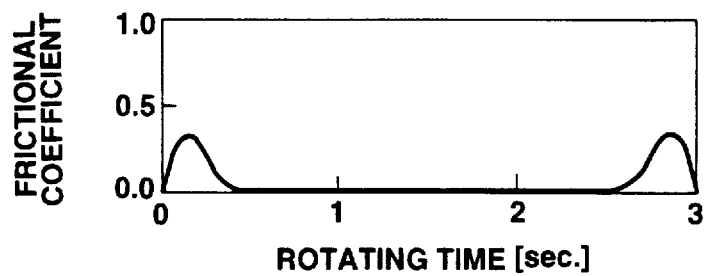
FIG. 5 is a graph showing changes in the frictional coefficient between the CSS area and the slider in case of the CSS with the magnetic disc of Example 1.
Figure 6:
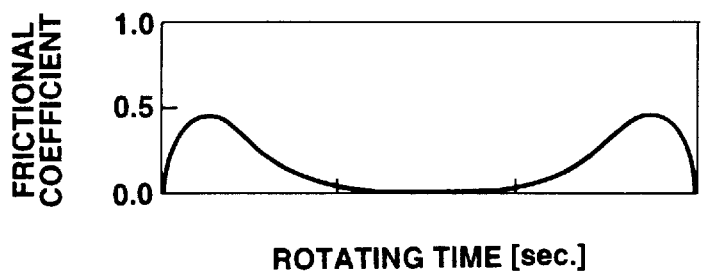
FIG. 6 is a graph showing changes in the frictional coefficient between the CSS area and the slider in case of the CSS with the magnetic disc of Example 2.
Figure 7:
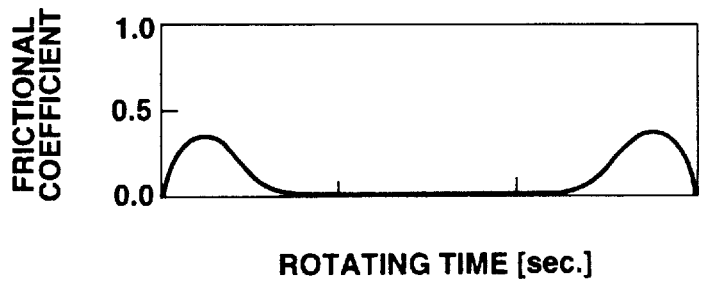
FIG. 7 is a graph showing changes in the frictional coefficient between the CSS area and the slider in case of the CSS with the magnetic disc of Example 3.

The magnetic discs of the Examples 1 to 3 were then checked as to changes in the frictional coefficient brought about when floating and landing the slider from or on the CSS area 9. FIGS. 5, 6 and 7 show the measured results for the magnetic discs of the Examples 1, 2 and 3, respectively. The magnetic discs were rotated at the rpm of 3600 at a constant acceleration.

Thus it has been shown that the floating and landing complete time was shortest with the magnetic disc 1 of Example 1 having the entire surface of the CSS area 9 planarized to form the crest. With the magnetic disc of the Example 2 in which the CSS data area 15 has the pattern of crests and valleys and the CSS servo area 16 is planarized to form the valley, the floating and landing complete time is longer, whereas, with the magnetic disc of the Example 3 in which the CSS data area 15 similarly has the pattern of crests and valleys and the CSS servo area 16 is formed as the crest, the above time is significantly short, thus indicating that the larger the area of the crest in the CSS area 9, the shorter is the time the slider 11 is contacted with the magnetic disc.

In general, if the time the slider 11 is contacted with the magnetic disc is longer, the takeoff speed, that is the speed with which the slider has a takeoff from the CSS area, becomes higher, while the amount of float of the slider 11 becomes lower, so that, for assuring a sufficiently large amount of float, it is effective to increase the area of the crest in the CSS area 9.

The slider 11 was floated from the CSS area 9 of each of the magnetic discs of the Examples 1 to 3 and the Comparative Example 1 in order to check the amount of float of the slider 11.

Figure 8:
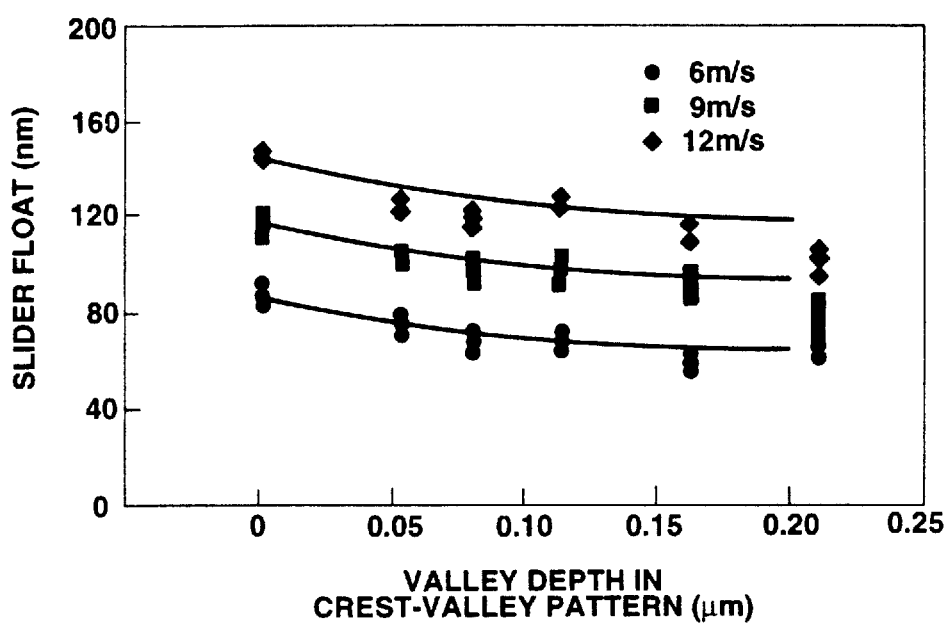
FIG. 8 is a graph showing the relation between the depth of the valley in the pattern of the crests and valleys on the magnetic disc surface and the amount of float of the slider.
Figure 9A:
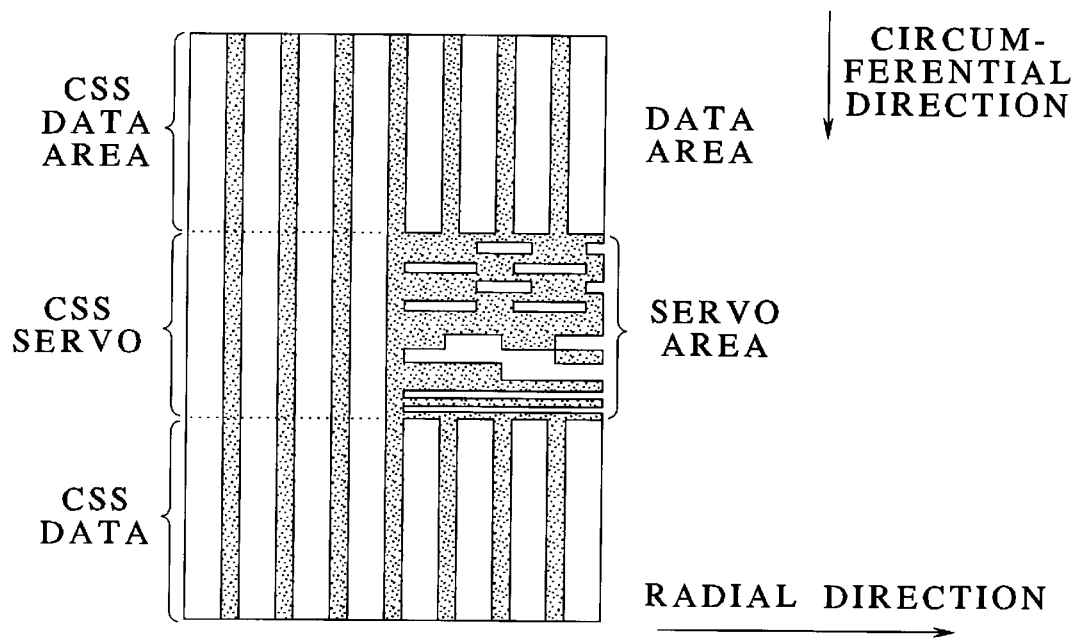
FIG. 9A illustrates the embodiment of Example 3.
Figure 9B:
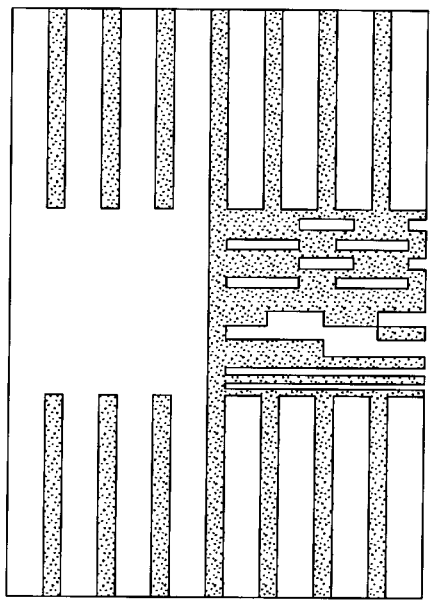
FIG. 9B illustrates the embodiment of Example 4.

FIG. 8 shows the relation between the depth of the valleys in the pattern of crests and valleys on the magnetic disc surface and the float of the slider 11. It is seen that, since the deeper the valley, the smaller becomes the amount of float of the slider 11, the amount of float in the CSS area 9 becomes larger the larger the area of the crests.

Comparison was also made of the floating posture of the slider 11 on the respective CSS areas 9.

Since the floating posture becomes labile depending on the local difference in the float amount of the slider 11 the CSS area 9 affords to the slider 11, the floating posture becomes stabilized more significantly the more the CSS area 9 is planarized. Thus it is possible for the magnetic discs of the Examples 1 to 4 to give a more stable floating posture than for the magnetic disc of the Comparative Example 1. Meanwhile, comparison of the Examples 1 to 4 to one another reveals that the magnetic disc of the Example 1 having the CSS area 9 planarized in its entirety or the magnetic disc of the Example 4 having both the crests and valleys of the CSS area 9 planarized over the entire disc circumference can give a more stable floating posture the magnetic discs of the Example 2 and 3 having different patterns of crests and valleys between the CSS data area 15 and the CSS servo area 16.

Next, the sliders 11 floated from the CSS areas 9 of the magnetic discs of Examples 1 to 3 were moved to desired recording tracks 7 of the magnetic recording areas 2 in order to check the variation in the floating posture.

The closer the amount of float the CSS area 9 affords to the slider 11 to the amount of float the magnetic recording area 2 affords to the slider 11, the more stable is the floating posture during the above movement. Thus the magnetic discs of Examples 2 to 4 having the pattern of crests and valleys of the CSS data area 15 similar to that of the magnetic recording area 5 in the magnetic recording area 2 can give a more stable floating posture than the magnetic disc of Example 1 having the CSS area 9 planarized in its entirety. The stable floating posture during the above movement leads to a stable floating posture at the time of start of writing/readout thus enabling accurate data writing/readout.

The magnetic head was caused to follow the inner most recording track 7 of each of the magnetic discs in order to check the floating posture of the slider 11.

It has similarly been found that the closer the amount of float the CSS area 9 affords to the slider 11 to the amount of float the magnetic recording area 2 affords to the slider 11, the more stable is the floating posture during the above movement. Thus the magnetic discs of Examples 2 to 4 can give a more stable floating posture than the magnetic disc of Example 1.

For reference sake, measurements were made of magnetic properties of the magnetic discs of Examples 1 to 4. It was found that the magnetic discs exhibited coercivity Hc of 120 kA/m which is sufficient for the magnetic disc. Comparison of the magnetic discs as to the resonance frequency has revealed that the resonance frequency not lower than that the servo range (450 Hz) could be obtained for any of the magnetic discs.

It is seen from the above results that powder debris may be prevented with the magnetic discs of Examples 1 to 4 in which the CSS servo area 15 is planarized at least in the circumferential direction. It is also seen that, if the CSS area 9 presents a planarized surface in its entirety, the floating posture of the slider 11 in the CSS area 9 is stabilized, and that, if the CSS data area 15 has the pattern of crests and valleys similar to that of the data area 5, the floating posture of the slider 11 is stabilized during the time when the slider 11 is moved from the CSS area 9 to the magnetic recording area 2 or when the magnetic head is caused to follow the inner most recording track 7 in the magnetic recording area 2.

The present invention is not limited to the magnetic discs described in the above embodiments. For example, the entire surface of the CSS area 9 may be planarized at the same height level as the guard band 8, or the CSS area 9 may be arranged radially outside the magnetic recording area 2. In addition, various changes may be made in connection with the materials of the disc substrate, underlying layer, magnetic layer, protective film or the lubricant layer making up the magnetic disc, the diameter or the thickness of the magnetic disc.

What is claimed is:

1. A magnetic disc having a magnetic recording area on or from which information may be recorded or reproduced by a transducing device mounted on a slider and a CSS area for contact-start-stop operations for said slider, comprising:

a plurality of data areas located in said magnetic recording area, comprising recording tracks in the form of crests extending in a circumferential direction, and guard bands in the form of valleys, extending in the circumferential direction, provided between said recording tracks;

a plurality of servo areas in the form of crests and valleys, located in said magnetic recording area, isolating said data areas from each other in the circumferential direction;

a plurality of CSS data areas located in the CSS area, radially consecutive to said data areas and having first regions comprised of planarized crests extending in the circumferential direction, and second regions comprised of planarized valleys which extend in the circumferential direction provided between the first regions;

a plurality of CSS servo areas located in the CSS area radially consecutive to the servo areas; and
   wherein the CSS servo areas are planarized along their entire surface to a same height as the first regions.

2. A magnetic disc having a magnetic recording area on or from which information may be recorded or reproduced by a transducing device mounted on a slider and a CSS area for contact-start-stop operations for said slider, comprising:

a plurality of data areas located in said magnetic recording area, comprising recording tracks in the form of crests extending in a circumferential direction, and guard bands in the form of valleys, extending in the circumferential direction, provided between said recording tracks;

a plurality of servo areas in the form of crests and valleys, located in said magnetic recording area, isolating said data areas from each other in the circumferential direction;

a plurality of CSS data areas located in the CSS area, radially consecutive to said data areas and having first regions comprised of planarized crests extending in the circumferential direction, and second regions comprised of planarized valleys which extend in the circumferential direction provided between the first regions;

a plurality of CSS servo areas located in the CSS area radially consecutive to the servo areas; and wherein the CSS servo areas having third regions comprised of planarized crests which extend in the circumferential direction, having the same height as the first regions and being radially consecutive to the first regions, and further comprised of fourth regions comprised of planarized valleys which extend in the circumferential direction, having a same height as said second regions and being radially consecutive to the second regions.

* * * * *